Feb. 20, 1940.                H. W. HERRINGTON                2,191,074
DYNAMO-ELECTRIC MACHINE
Filed July 31, 1937

INVENTOR
H. W. HERRINGTON
BY
Wayne B Wells
ATTORNEY

Patented Feb. 20, 1940

2,191,074

UNITED STATES PATENT OFFICE 2,191,074

DYNAMO-ELECTRIC MACHINE

Harold W. Herrington, Verona, N. J., assignor to Bell Telephone Laboratories, Incorporated, New York, N. Y., a corporation of New York Application July 31, 1937, Serial No. 156,669

4 Claims. (Cl. 171—227)

This invention relates to dynamo-electric machines and particularly to regulated dynamo-electric machines.

One object of the invention is to provide a dynamo-electric machine having stator and rotor members that shall automatically vary an air-gap between the rotor and stator members according to temperature changes.

Another object of the invention is to provide a dynamo-electric machine having a rotor and a U-shaped stator core with the poles thereof positioned adjacent to said rotor that shall have a thermal device connected between the arms of said core for varying the air-gaps between the stator core poles and the rotor according to temperature changes.

A further object of the invention is to provide an alternating current dynamo-electric machine having a toothed rotor, a U-shaped stator core with the poles thereof positioned adjacent to said rotor and an armature winding mounted on said core that shall have a thermal device connected between the arms of said core for varying the air-gaps between the stator poles and the rotor according to temperature changes.

The operating characteristic of a dynamo-electric machine varies with temperature changes. Thus in a generator the voltage produced by the generator will vary with temperature changes even if the speed of the generator is maintained constant. In many machines, such, for example, as an alternating current generator employed for testing purposes, it is essential to maintain the generated voltage substantially constant irrespective of temperature changes.

In accordance with the invention means are provided for automatically varying the lengths of the air-gaps between the stator poles and the rotor according to temperature changes to maintain the generated voltage constant irrespective to temperature changes. The invention has been illustrated by means of an alternating current generator having a toothed rotor and a U-shaped stator core. The stator core is in the form of a permanent magnet but if so desired may be provided with an exciting winding. An armature winding is mounted on the stator core. A temperature responsive device is connected between the two arms of the U-shaped core member for varying the air-gaps between the stator and the rotor according to temperature changes. The temperature responsive device may be composed of brass and iron or any other suitable metals.

If the temperature of the above-described generator tends to increase, the voltage produced by the generator would tend to decrease unless means is taken to compensate the machine operation for temperature change. According to the invention an increase in temperature will cause the temperature responsive device to decrease the air-gaps between the stator poles and the rotor so as to compensate the generator operation for the temperature change. In like manner, a decrease in temperature will tend to increase the generated voltage which will be compensated for by increasing the air-gaps between the stator poles and the rotor.

In the accompanying drawing Fig. 1 is a diagrammatic view of a dynamo-electric machine constructed in accordance with the invention.

Figure 2:
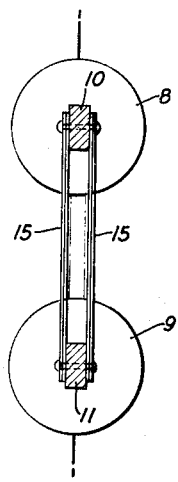
Fig. 2 is a sectional view along the line 2—2 of the machine shown in Fig. 1.
Figure 1:
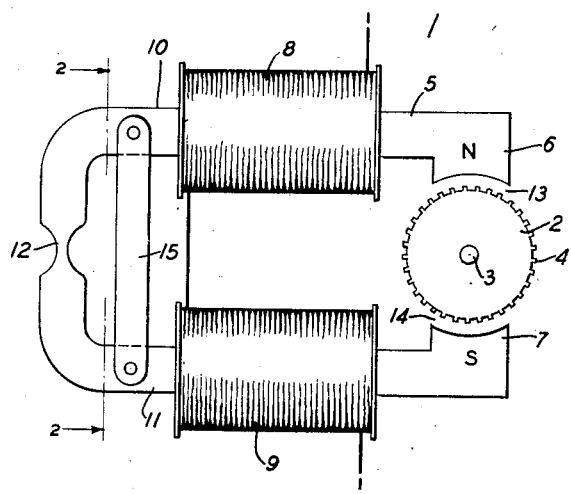

Referring to Figs. 1 and 2 of the drawing, a generator 1 is shown comprising a rotor 2 mounted on a shaft 3 and having projecting teeth 4 and a stator comprising a U-shaped core member 5. The core member 5 is preferably a permanent magnet having pole extensions 6 and 7. It is to be understood that if so desired the core member 5 may be separately excited by any suitable source of direct current. An armature winding comprising two coils 8 and 9 is shown mounted on the arms 10 and 11 of the U-shaped core member 5. A portion 12 of the core member has a reduced cross-section as shown in Fig. 1 of the drawing in order to facilitate the flexing of the arms 10 and 11 to vary the air-gaps 13 and 14 between the rotor and the pole extensions 6 and 7.

Two bi-metallic strips 15, which may be composed of brass and iron or any other suitable materials having different temperature coefficients of expansion, are connected between the two arms 10 and 11 of the U-shaped core member 5. The bi-metallic strips 15 are positioned on opposite sides of the arms 10 and 11 and are temperature responsive in order to adjust the positions of the arms 10 and 11 according to the temperature of the machine. An adjustment of the arms 10 and 11 according to temperature changes will also adjust the air-gaps 13 and 14 between the pole extensions 6 and 7 and the rotor 2.

In a machine as above described it is apparent that an alternating current will be generated in the armature winding, having a frequency according to the speed of the rotor and the number of teeth 4 on the rotor. The voltage generated by the machine will not only vary according to the speed of the rotor but will also vary according to the temperature of the machine. If the speed of the rotor 2 is maintained constant, the voltage generated will have to be corrected only in accordance with temperature changes.

A correction for temperature changes on the machine is effected by means of the bi-metallic strips 15 which are connected between the arms 10 and 11 of the U-shaped core member 5. In case the temperature of the machine increases with a tendency to reduce the voltage generated, the bi-metallic strips 15 will buckle and tend to draw the arms 10 and 11 together. Such movement of the arms 10 and 11 will reduce the air-gaps 13 and 14 to correct for the change in the generated voltage. An opposite operation takes place in case the temperature of the machine is reduced. A reduction in the machine temperature tends to increase the machine's voltage. When the temperature of the machine is reduced the buckle or bend in the strips 15 tends to reduce and thus to increase the air-gaps 13 and 14. The increase in the air-gap compensates for the tendency of the generated voltage to increase.

Figure 4:
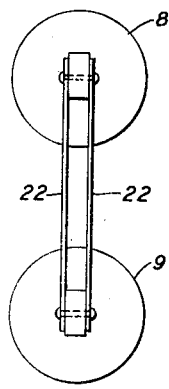
Figs. 3 and 4 are respectively elevational and end views of a modification of the machine shown in Fig. 1.
Figure 3:
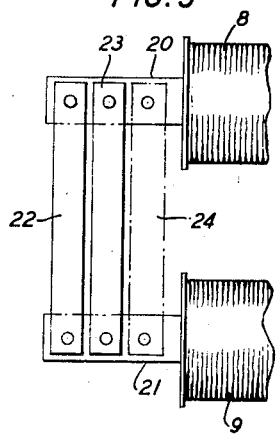

Referring to Figs. 3 and 4 of the drawing, the armature winding comprising coils 8 and 9 is mounted on two arms 20 and 21. The arms 20 and 21 have poles adjacent to the rotor 2, similar to the poles 6 and 7 shown in Fig. 1 of the drawing. Inasmuch as the pole structure for the modification shown in Figs. 3 and 4 is similar to the pole structure shown in Figs. 1 and 2, it is deemed unnecessary to illustrate the same in Fig. 3 of the drawing. The arms 20 and 21 are preferably in the form of permanent magnets but could be excited by direct current coils if so desired.

Two brass strips 22 are connected to the arms 20 and 21 beyond the coils 8 and 9, as shown in Figs. 3 and 4 of the drawing. Adjacent to the brass strips 22, two iron strips 23 are connected to opposite sides of the arms 20 and 21. The brass and iron strips 22 and 23 have different temperature coefficients of expansion so that when a change in temperature takes place the brass strips will extend in length a different amount from the iron strips.

Assuming the temperature of the generator 1 to increase, the brass and iron strips 22 and 23 will extend in length. However, the brass strips will increase in length a greater amount than the iron strips. Accordingly, the arms 20 and 21 will be moved by the brass strips 22 about pivots formed by the connections of the iron strips 23 to the arms 20 and 21. This movement of the arms 20 and 21 will decrease the air-gaps formed between the poles on the ends of the arms 20 and 21 and the rotor to increase the generator voltage and thus compensate for the reduction in voltage normally caused by increased temperatures.

If the temperature of the generator 1 tends to decrease, the brass strips 22 will shorten at a faster rate than the iron strips 23. Such relative movement of the brass strips 22 with respect to the iron strips 23 would move the arms 20 and 21 to increase the air-gaps between the poles on the arms and the rotor. Although brass and iron strips have been referred to in describing the modification shown in Figs. 3 and 4 of the drawing, it is to be understood that any other suitable material having different coefficients of expansion may be employed if so desired. However, it is desirable that one of the pair of strips be composed of magnetic material in order to complete the magnetic circuit for the generator.

If a material having a lower coefficient of expansion is used with iron strips in place of the brass strips 22, then the strips of material having a lower coefficient of expansion would have to be connected to the arms 20 and 21 on the other side of the iron strips 23, as indicated by strips 24 shown in dot and dash lines. In a thermal control device of the type shown in Figs. 3 and 4 of the drawing it is necessary to position the strips having the greater coefficient of expansion nearer the ends of the arms 20 and 21.

Modifications in the machine and in the arrangement and location of parts may be made within the spirit and scope of the invention and such modifications are intended to be covered by the appended claims.

What is claimed is:

1. A dynamo-electric machine comprising a rotor, a U-shaped stator core having the poles thereof positioned adjacent said rotor, a portion of the yoke of said U-shaped core being reduced in cross-section to permit flexing of the arms thereof, and means comprising a thermal element connected between the arms of said U-shaped core at a substantial distance from the rotor and varying in length according to temperature changes for varying the position of said arms with respect to each other to adjust the air-gaps between the stator poles and the rotor according to temperature changes while maintaining the different portions of the pole faces substantially symmetrical with respect to the rotor.

2. An alternating current generator comprising a toothed rotor, a U-shaped stator core having the poles thereof positioned adjacent to said rotor, an armature winding mounted on said core, a portion of the yoke of said core being reduced in cross-section to permit flexing of the arms thereof, and means comprising a bi-metallic temperature responsive strip connected between the arms of said core at a substantial distance from the rotor for varying the air-gap between the stator poles and the rotor according to temperature changes.

3. A dynamo-electric machine comprising a permanent magnet core having a pair of rigid substantially parallel arms with poles formed on the ends of the arms, a winding mounted on said arms, a toothed rotor positioned between the poles on the ends of said arms and forming air-gaps with the poles formed on the ends of the arms, means for insuring a hinge movement of said arms at a distance sufficiently remote from the rotor to cause the symmetrical relation between the pole faces and the rotor to remain substantially unchanged as the arms effect hinge movement, and thermostatic means connected to said arms for varying the position of the arms and consequently the magnitude of the air-gaps in accordance with temperature changes.

4. A dynamo-electric machine comprising a permanent magnet core having a pair of rigid substantially parallel arms with poles formed on the ends of the arms, said arms consisting of material having a uniform coefficient of expansion whereby no bending of the arms occurs upon change of temperature, a winding mounted on said arms, a toothed rotor positioned between the poles on the ends of said arms and forming air-gaps with the poles formed on the ends of the arms, means for insuring a hinge movement of said arms at a distance sufficiently remote from the rotor to cause the symmetrical positioning of the pole faces with respect to the rotor to remain substantially unchanged during movement of the arms, and temperature responsive means connected to said arms for varying the position of the arms and consequently the magnitude of the air-gaps in accordance with temperature changes.

HAROLD W. HERRINGTON.